US011216439B2

(12) United States Patent
Curtis-Maury et al.

(10) Patent No.: US 11,216,439 B2
(45) Date of Patent: Jan. 4, 2022

(54) AUTO-EXPIRING LOCKS BASED ON OBJECT STAMPING

(71) Applicant: NETAPP, INC., Sunnyvale, CA (US)

(72) Inventors: Matthew Curtis-Maury, Apex, NC (US); Aditya Kulkarni, Morrisville, NC (US); Vinay Devadas, Apex, NC (US)

(73) Assignee: NETAPP, INC., San Jose, CA (US)

( * ) Notice: Subject to any disclaimer, the term of this patent is extended or adjusted under 35 U.S.C. 154(b) by 280 days.

(21) Appl. No.: 16/513,362

(22) Filed: Jul. 16, 2019

(65) Prior Publication Data
US 2019/0340162 A1 Nov. 7, 2019

Related U.S. Application Data

(63) Continuation of application No. 14/928,481, filed on Oct. 30, 2015, now Pat. No. 10,452,633.

(51) Int. Cl.
*G06F 16/23* (2019.01)
*G06F 16/176* (2019.01)

(52) U.S. Cl.
CPC ...... *G06F 16/2308* (2019.01); *G06F 16/1774* (2019.01)

(58) Field of Classification Search
CPC .................... G06F 16/1774; G06F 16/2308
See application file for complete search history.

(56) References Cited

U.S. PATENT DOCUMENTS

| 5,212,788 | A | * | 5/1993 | Lomet ................. G06F 16/2477 |
| 5,960,194 | A | | 9/1999 | Choy et al. |
| 6,067,604 | A | * | 5/2000 | Ramachandran ......... G06F 9/52 707/999.202 |
| 6,658,652 | B1 | | 12/2003 | Alexander, III et al. |
| 9,171,019 | B1 | * | 10/2015 | Donlan ............... G06F 16/2343 |
| 9,817,703 | B1 | | 11/2017 | Ryland et al. |
| 2005/0071320 | A1 | | 3/2005 | Chkodrov et al. |
| 2006/0190504 | A1 | | 8/2006 | Pruet, III |
| 2007/0282838 | A1 | | 12/2007 | Shavit et al. |

(Continued)

OTHER PUBLICATIONS

Notice of Allowawnce on co-pending (U.S. Appl. No. 14/928,452) dated Jul. 17, 2019.

(Continued)

*Primary Examiner* — Matthew J Ellis
(74) *Attorney, Agent, or Firm* — Klein, O'Neill & Singh, LLP

(57) ABSTRACT

Presented herein are methods, non-transitory computer readable media, and devices for efficiently administering locks for shared resources, such as data blocks, stored on a storage system. Methods for stamping a plurality of computer data objects are disclosed which include: accessing at least one of the plurality of computer data objects by a first data thread; assigning, by the first data thread, a stamp to the at least one of the plurality of computer data objects, to signify the at least one of the plurality of computer data objects is associated with the first data thread; preventing subsequent access by a second data thread to the stamped at least one of the plurality of computer data objects; and determining the stamp is no longer active, upon an event, effectively releasing the at least one of the plurality of computer data objects.

20 Claims, 7 Drawing Sheets

(56) References Cited

U.S. PATENT DOCUMENTS

| | | |
|---|---|---|
| 2009/0172701 A1 | 7/2009 | Gamaley et al. |
| 2010/0211682 A1* | 8/2010 | Capomassi ......... G06F 16/2322 |
| | | 709/226 |
| 2012/0079483 A1* | 3/2012 | Kahlon .................. G06F 9/524 |
| | | 718/100 |
| 2012/0137075 A1 | 5/2012 | Vorbach |
| 2012/0166757 A1 | 6/2012 | Volvovski et al. |
| 2014/0149515 A1 | 5/2014 | Grunwald et al. |
| 2014/0181833 A1* | 6/2014 | Bird ...................... G06F 9/5077 |
| | | 718/105 |
| 2017/0124109 A1 | 5/2017 | Curtis-Maury et al. |

OTHER PUBLICATIONS

Non-Final Office Action on co-pending (U.S. Appl. No. 14/928,452) dated Jan. 23, 2018.
Final Office Action on co-pending (U.S. Appl. No. 14/928,452) dated Aug. 7, 2018.
Non-Final Office Action on co-pending (U.S. Appl. No. 14/928,452) dated Dec. 27, 2018.

\* cited by examiner

Each File Object Undergoes A First Serialization To Process The Threads Within The Operating System 602

→

The Object Is Stamped To Become A Locked Object 604

→

Incrementing the Serialization Count, Rendering The Outstanding Stamps Prior To The Increment Stale, Effectively Unlocking The Objects 606

FIG. 6

AUTO-EXPIRING LOCKS BASED ON OBJECT STAMPING

CROSS-REFERENCE TO RELATED APPLICATION

This patent application claims priority of and is a continuation of U.S. patent application Ser. No. 14/928,481, filed on Oct. 30, 2015, now granted U.S. Pat. No. 10,452,633, the disclosure of which is incorporated herein by reference in its entirety.

TECHNICAL FIELD

The present disclosure relates generally to mass data storage networks and data storage filing systems. More particularly, aspects of this disclosure relate to methods, non-transitory computer readable media, and devices for efficiently administering locks for shared resources, such as data buffers, stored on a storage system.

BACKGROUND

A storage server is a computer system that is used to store and retrieve data on behalf of one or more clients on a network. A storage server can be used for many different purposes, such as to provide multiple users with access to shared data or to backup mission critical data. One example of a storage server is a file server. A file server operates on behalf of one or more clients to store and manage shared files in a set of mass storage devices, such as magnetic or optical storage based disks or tapes. The mass storage devices may be organized into one or more volumes of Redundant Array of Inexpensive Disks (RAID). These storage servers provide multiprocessors that may execute tasks on behalf of the multiple users. These multiprocessors can include several or several hundred processors running concurrently.

Managing the concurrent execution involves safeguarding data from modification by multiple processes. Indeterminate results, deadlocks, and data corruption may result if multiple tasks modify or access the same dataset. Accordingly, concurrent execution conditions on multiprocessor systems are managed to assure the proper access of data. Conventionally, fine-grained locking manages concurrent execution on multiple processors by dividing a task into many smaller pieces of code. Placing locks around these small pieces of code keeps them from being accessed or modified by other tasks.

The resources of a storage server are limited. Under current operation, numerous tasks must be frequently locked and unlocked. Both locking and unlocking becomes expensive because a significant fraction of the execution time may be spent unlocking tasks. Any time a lock is acquired or released, the state of the lock must be reflected in the storage server's global memory. Some of the drawbacks of locking include bringing the relevant cache line into the CPU's cache and invalidating it on other CPUs' caches. However, frequent cache line invalidations and cache misses negatively impact performance.

BRIEF DESCRIPTION OF THE DRAWINGS

FIG. 6 is an exemplary method for locking a plurality of computer data objects utilizing the serialization count stamp protocol.

Figure 1:
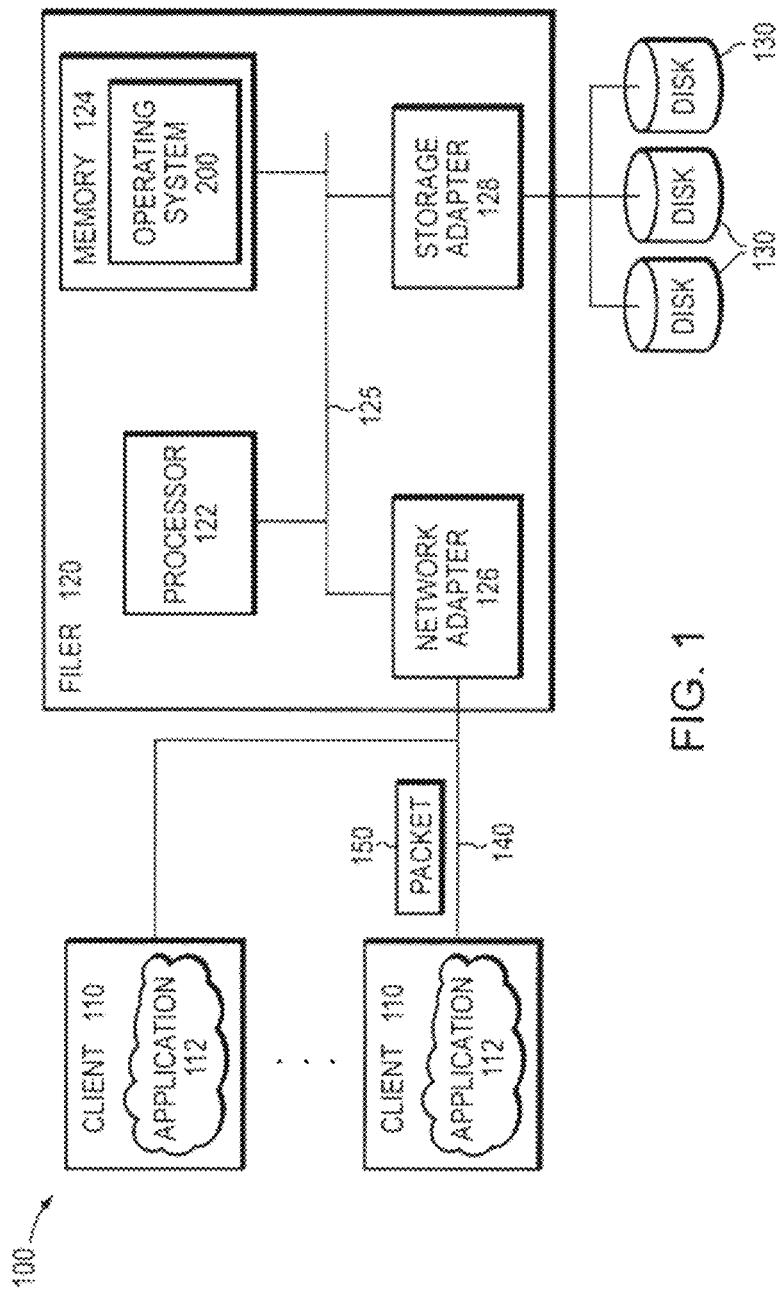
FIG. 1 is a schematic block diagram of a computer network including a plurality of clients and a file server that may be advantageously used with the present disclosure.

The present disclosure is susceptible to various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the disclosure as defined by the appended claims.

DETAILED DESCRIPTION OF ILLUSTRATED EXAMPLES

The present disclosure is directed to a system and method for efficiently administering locks for shared resources, such as data blocks, stored on a storage system. As used herein, the term "mass data storage system" generally refers to the computer-executable code operable on a computer to perform a storage function that manages data access and may, in the case of a storage system, implement data access semantics of a general purpose operating system. The mass data storage system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof (i.e. a workload), embodied as or including a storage system. Moreover, the teachings of this disclosure can be adapted to a variety of storage system architectures including, but not limited to, a network-attached storage environment, a storage area network, a disk assembly directly-attached to a client or host computer and, illustratively, a cluster of interconnected storage system nodes. The term "storage system" should therefore be taken broadly to include such arrangements in addition to any subsystems configured to perform a storage function and associated with other equipment or systems. It should be noted that while this description is written generally in terms of a log-structured file system, the teachings of the present disclosure may be utilized with any suitable file system, including a write anywhere file system.

It is desirable to improve the performance of storage servers, and one way to do so is by efficiently administering locks for shared resources, such as data buffers, stored on a storage system. Aspects of this disclosure are directed to methods, non-transitory computer readable media, and devices for locking data buffers without requiring those locks to be explicitly released. Disclosed, for example, objects are locked in this system where the object is marked with a 'stamp' indicating that it has been locked. This stamp need not be updated to relinquish the lock on the object. Subsequent lock attempts for an already locked object will fail and the object's locked status will be detected. At a later time, globally tracked data is updated at periodic intervals via a global serialization that implicitly makes the lock stamp on locked objects stale/obsolete, effectively unlocking the object. In this way, future attempts to lock the object will be able to succeed without the object having ever been explicitly unlocked. In other words, where many objects must be frequently locked and unlocked, the disclosed embodiments are particularly beneficial as a significant fraction of the execution time is spent unlocking objects.

For at least some embodiments, the stamp on locked objects can take many different forms depending upon the design. The placement of the stamp onto the object is performed under a fine-grained lock that is acquired and released immediately surrounding the stamp application. This fine-grained lock can be global, per-object, or represent a subset of objects. When a thread locks an object, the lock takes the form of a 'stamp' placed on the object. In some embodiments, threads that access an object become serialized. The stamp is the current value of a serialization count. A global serialization can occur at periodic intervals, where the global serialization count can be tracked at each serialization point. For example, subsequent locking attempts on an object will find the current stamp matches the serialization count and thus knows the object is already locked. The serialization count will be incremented at the next global synchronization point. This effectively makes the outstanding stamps prior to the increment stale, so subsequent locking attempts will be ensured not to find an active stamp. In this approach, all active locks are implicitly released when the serialization count is incremented.

In some embodiments, threads that access an object are assigned a monotonically increasing timestamp when it begins running on a CPU. The thread timestamp is inserted in a data structure that tracks all thread timestamps. When the thread preempts, it removes its timestamp from the data structure. To acquire a lock on an unlocked object, a thread stamps the object with its timestamp. To determine whether an object is locked, a thread compares the existing (if any) current stamp on the object with the minimum thread timestamp, retrieved from the data structure. If the stamp is lower, then it can determine the thread holding the lock is no longer valid and therefore the object is unlocked. Contrarily, if the stamp is equal or higher than the minimum thread timestamp, then it determines the object is locked. A lock attempt proceeds to stamp the object where it is determined no active lock is present. In this approach, it is safe to hold locks across preemption. Rather than acquiring a new timestamp when a thread starts, new timestamps are only assigned once it is determined that the thread holds no locks. Similarly, the thread timestamp is only removed from the timestamp data structure at this time.

Referring now to the drawings, wherein like reference numerals refer to like features throughout the several views, FIG. 1 is a schematic block diagram of a computer network 100 including a plurality of client systems 110 and a filer server, such as a network storage appliance, that may be advantageously used with the present disclosure. The file server 120 is a computer that provides file service relating to the organization of information on storage devices, such as disks 130. The file server 120 generally comprises a processor 122, a memory 124, a network adapter 126 and a storage adapter 128 interconnected by a system bus 125. The file server 120 also includes a storage operating system 200 that implements a file system to logically organize the information as a hierarchical structure of directories and files on the disks.

In the illustrative embodiment, the memory 124 may have storage locations that are addressable by the processor and adapters for storing software program code and data structures associated with the present disclosure. The processor and adapters may, in turn, comprise processing elements and/or logic circuitry configured to execute the software code and manipulate the data structures. The storage operating system 200, portions of which are typically resident in memory and executed by the processing elements, functionally organizes the file server 120 by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 126 comprises a network interface card (NIC) having the mechanical, electrical and signaling circuitry needed to connect the file server 120 to clients 110 over computer network 100, which may comprise a point-to-point connection or a shared medium, such as a local area network. The clients 110 may be general-purpose computers configured to execute applications 112. Moreover, the clients 110 may interact with the file server 120 in accordance with a client/server model of information delivery. That is, each client may request the services of the file server 120, and the file server 120 may return the results of the services requested by the client, by exchanging packets 150 over the network 140. It will be understood to those skilled in the art that the inventive technique described herein may apply to any server capable of providing a shared resource service to any client in accordance with various applications executing on the client communicating with server applications on a server.

The storage adapter 128 cooperates with the storage operating system 200 executing on the file server 120 to access information requested by the client, which information may be stored on any storage media, such as the disks 130. The storage adapter includes input/output (I/O) interface circuitry that couples to the disks over an I/O interconnect arrangement, such as a conventional high-performance, Fibre Channel serial link topology. The information is retrieved by the storage adapter and, if necessary, processed by the processor 122 (or the adapter 128 itself) prior to being forwarded over the system bus 125 to the network adapter 126, where the information is formatted into a packet and returned to the client 110.

Storage of information on the file server 120 is preferably implemented as one or more storage "volumes" that comprise a cluster of physical storage disks 130, defining an overall logical arrangement of disk space. Each volume is generally associated with its own file system. To facilitate access to the disks 130, the storage operating system 200 implements a file system that logically organizes the information as a hierarchical structure of directories and files on the disks. Each "on-disk" file may be implemented as a set of disk blocks configured to store information, such as data, whereas the directory may be implemented as a specially formatted file in which information about other files and directories are stored. It is expressly contemplated that any appropriate file system can be used, and as such, it should be taken broadly to refer to any file system that is otherwise adaptable to the teachings of this disclosure.

Figure 2:
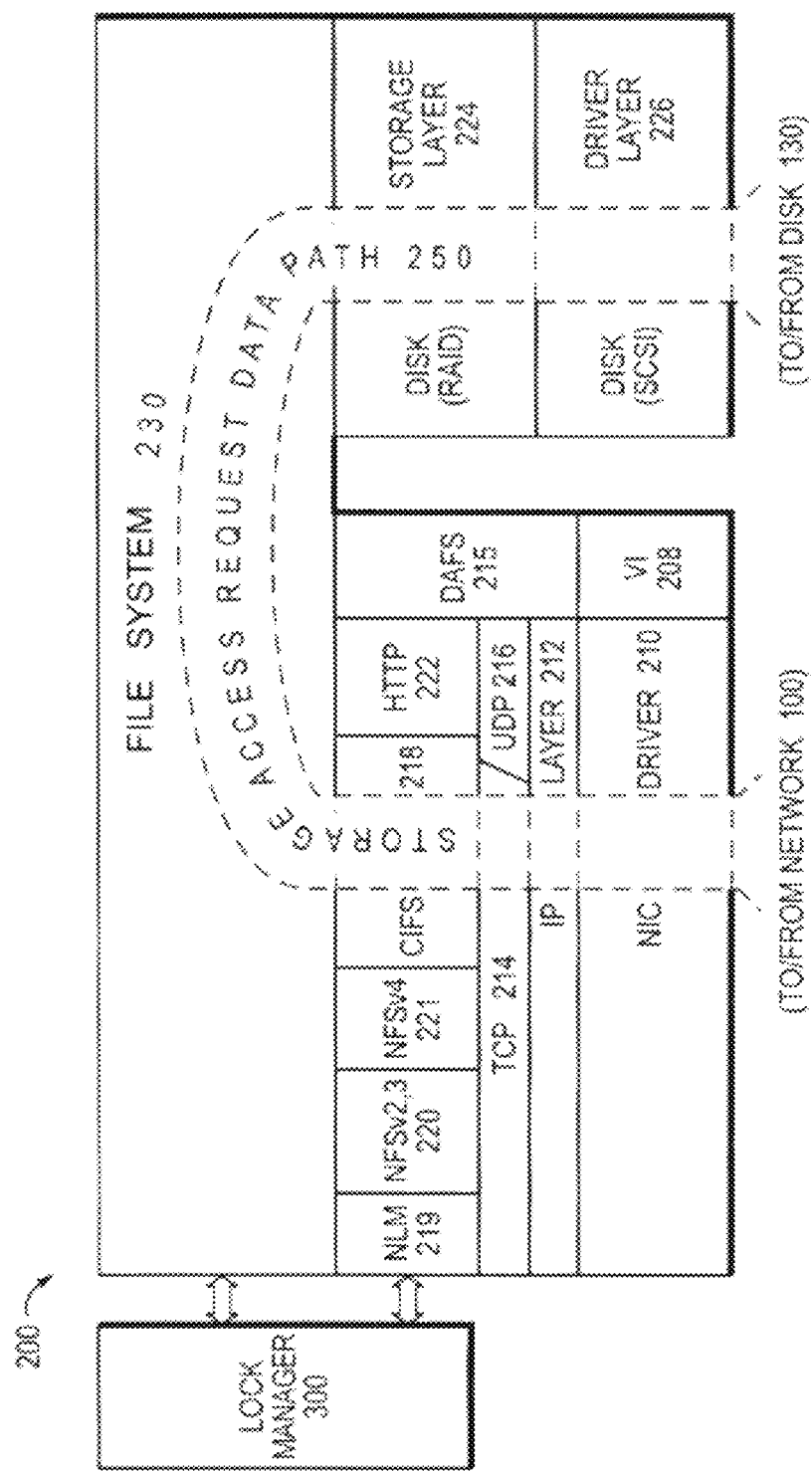
FIG. 2 is a schematic block diagram of a storage operating system that may be advantageously used with the present disclosure.

Referring to FIG. 2, a schematic block diagram of the storage operating system 200 that may be advantageously used with the present disclosure. The storage operating system 200 comprises a series of software layers, including a network interface card (NIC) layer 210 of network drivers (e.g., an Ethernet driver) and a virtual interface (VI) layer 208 of VI device drivers. The operating system further includes network protocol layers, such as the Internet Protocol (IP) layer 212 and its supporting transport mechanisms, the Transport Control Protocol (TCP) layer 214 and the User Datagram Protocol (UDP) layer 216. A file access protocol layer provides multi-protocol data access. The storage operating system 200 also includes a disk storage layer 224 that implements a disk storage protocol, such as a Redundant Array of Independent Disks (RAID) protocol, and a disk driver layer 226 that implements a disk access protocol such as, e.g., a Small Computer Systems Interface (SCSI) protocol.

Bridging the disk software layers with the network and file system protocol layers is a file system 230. The on-disk format representation of the file system 230 is block-based using, e.g., 4 kilobyte (kB) data blocks and using inodes to describe the files. A block is a logical unit of data stored on a storage device. Files, and other data, stored on the mass storage devices are typically stored in the form of one or more blocks. An inode is a data structure, e.g., a 128-byte structure, which is used to store information, such as meta-data, about a file. The meta-data contained in an inode may include, e.g., ownership of the file, access permission for the file, size of the file, file type and location of the file on disk. The file system 230 uses a file handle, i.e., an identifier that includes an inode number, to retrieve an inode from disk. The file system 230 also uses files to store meta-data describing the layout of its file system. These meta-data files include, among others, an inode file.

Operationally, a request from the client 110 is forwarded as, e.g., a conventional CIFS protocol packet 150 over the computer network 100 and onto the file server 120 where it is received at the network adapter 126. A network driver of the media access layer 210 processes the packet, passes it onto the network protocol layers 212-214 and CIFS layer 218 for additional processing prior to forwarding to the file system 230. Here, the file system 230 generates operations to load (retrieve) the requested data (and inode) from disk 130 if it is not resident "in core", i.e., in memory 124. If the information is not in memory, the file system 230 indexes into the inode file using the inode number to access an appropriate entry and retrieve a logical volume block number (VBN). The file system 230 then passes the logical VBN to the disk storage (RAID) layer 224, which maps that logical number to a disk block number and sends the latter to an appropriate driver (e.g., SCSI) of the disk driver layer 226. The disk driver accesses the disk block number from disk 130 and loads the requested data in memory 124 for processing by the file server 120. Upon completion of the request, the file server 120 (and operating system) returns a reply, e.g., a conventional acknowledgement packet defined by the CIFS specification, to the client 110 over the network 100.

It should be noted that the software "path" through the storage operating system layers described above needed to perform data storage access for the client request received at the file server 120 may alternatively be implemented in hardware. That is, in an alternate embodiment of the disclosure, the storage access request data path 250 may be implemented as logic circuitry embodied within a field programmable gate array (FPGA) or an application specific integrated circuit (ASIC). This type of hardware implementation increases the performance of the file service provided by a file server in response to a file system request packet 150 issued by client 110. Moreover, in another alternate embodiment of the disclosure, the processing elements of network and storage adapters 126, 128 may be configured to offload some or all of the packet processing and storage access operations, respectively, from processor 122 to thereby increase the performance of the file service provided by the file server 120. It is expressly contemplated that the various processes, architectures and procedures described herein can be implemented in hardware, firmware or software.

As used herein, the term "storage operating system" generally refers to the computer-executable code operable on a computer that manages data access and may, in the case of a file server 120, implement file system semantics. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., file serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

The present disclosure comprises a lock management system 300 configured to efficiently manage granting, revoking and releasing of various types of locks on concurrent threads that contain files or regions of files for shared resources, such as data buffers, located on a file server, such as a file server 120. The lock management system 300 allows the file server 120 to prevent harmful concurrent accesses to shared data.

Figure 3:
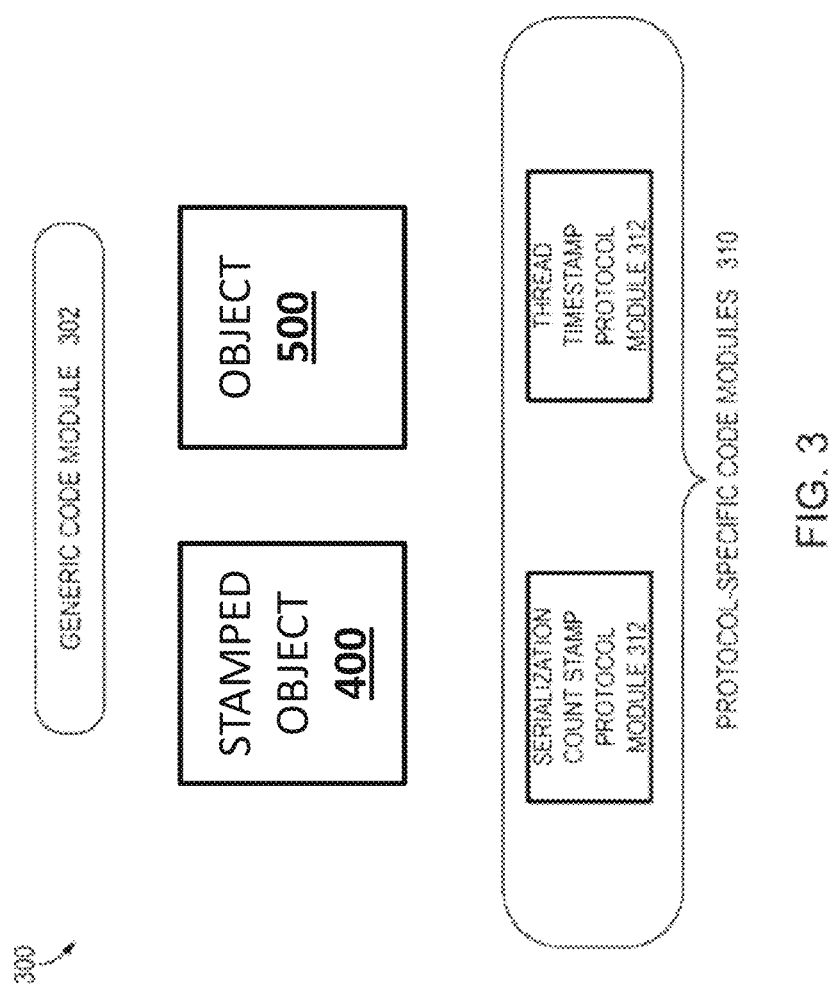
FIG. 3 a schematic block diagram of a multi-protocol lock manager having a plurality of data structures in accordance with the present disclosure.

In the illustrative embodiment described herein, the lock management system 300 comprises elements that cooperate to provide a general lock management service. These elements include code modules configured to manage concurrent access to information contained in various data structures. FIG. 3 is a schematic block diagram of the lock management system 300 comprising a generic code module 302 and various data structures. File blocks are cached in memory and are accessed by multiple concurrent threads. The stamp is placed on the object by any thread that accesses a buffer in memory to prevent a separate thread from finding this buffer resident in memory and evicting it underneath the previous thread (thereby changing what is in the buffer). As a result, any two concurrent accesses to the same buffer are prevented, whether read, write, or evict. In this way, a thread operating on a buffer in memory can know that the memory contents will not be changed underneath the thread. The data structures include stamped object 400 containing information that describes a particular lock and object 500 containing information that describes an object operated on by the lock management system 300.

The lock management system 300 include a serialization count stamp protocol module 312 and a thread timestamp protocol module 314. Regarding the serialization count stamp protocol module 312, a global serialization occurs at periodic intervals in the storage operating system 200 to process each thread. A global serialization count can be tracked that is implemented at each serialization point. When object 500 is accessed by a thread, the thread 'stamps' the object to become stamped object 400. The stamp is the current value of the serialization count. Subsequent access attempts on stamped object 400 will find the current stamp matches the serialization count, determining the stamped object 400 is already associated with a thread. The serialization count will be incremented at the next global synchronization point. This renders the outstanding stamps prior to the increment stale, effectively releasing the objects, so subsequent access attempts will be ensured not to find an active stamp. In this way, all active stamps are implicitly released when the serialization count is incremented.

The serialization point ensures there are no active threads that have stamped an object. All stamps placed on an object by a thread are not active any longer because storage operating system 200 reached a serialization point. As a result, the other threads are not active at the current serialization point. Once the current serialization count is stamped onto stamped object 400, it remains inaccessible by other threads until the next serialization point when the global serialization count is incremented, thereby releasing all blocks implicitly. In some embodiments, where multiple readers access block 500 to exclude write operations ('Reader-Writer Locks'), then an additional field is added to stamped object 400 indicating whether the current stamp represents a reader or a writer stamp. When a reader attempts to access object 500, it must ensure there are no active write stamps on the object using the serialization count stamp protocols. If there is no active stamp, then the stamp is placed on the object as above. If there is already an active read stamp on the object, then no action needs to be taken. When a writer attempts to access an object, it must ensure there is no active stamp of any kind (reader or writer) on the object and proceeds to stamp the object only in this case. When the global serialization count is increased, it invalidates all stamps regardless of whether they were reader or writer.

Figure 4:
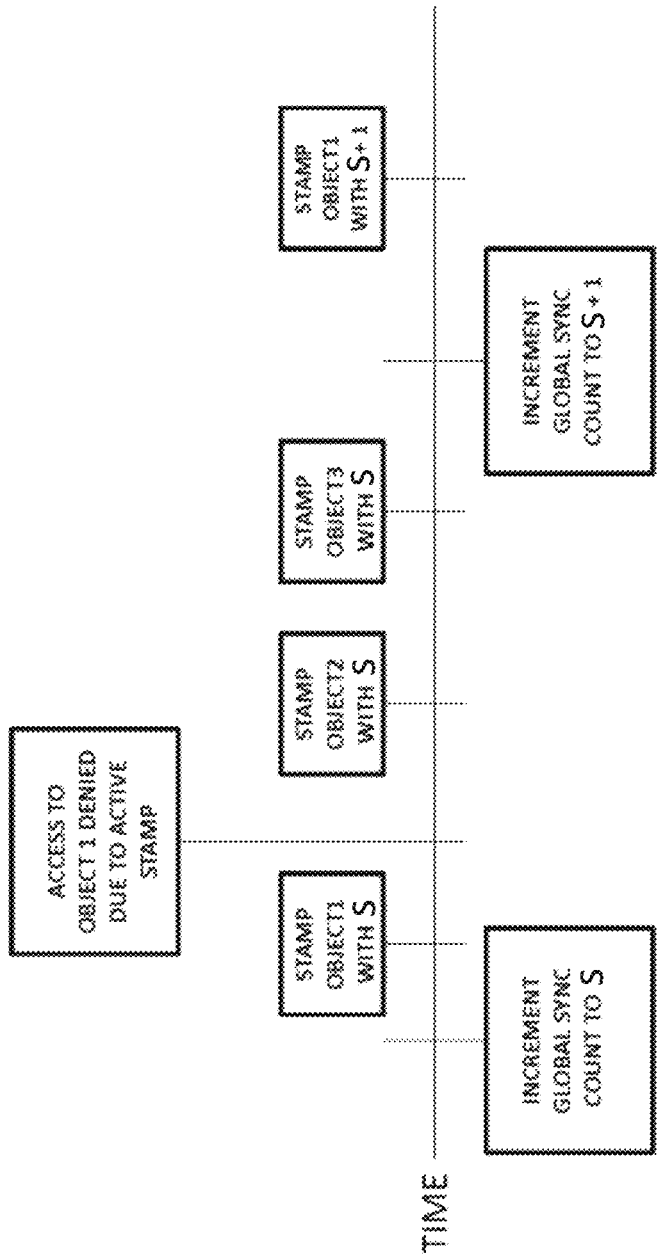
FIG. 4 is schematic block diagram of serialization count object stamping that may be advantageously used with the present disclosure.

Determining whether it's a regular lock or a reader/writer lock is an initial determination by the serialization count stamp protocol module 312. Referring to FIG. 4, a schematic block diagram of serialization count object stamping that may be advantageously used with the present disclosure. FIG. 4 exemplifies a timeline based on global increments to the synchronization count. The timeline also demonstrates different accesses to the objects. As shown, the different accesses to the objects does not have an access stamp, so object 1 is stamped with stamp S because that's the current global synchronization count set below the timeline. And if a second object, second access comes along to the same object it will observe that the object 1 is stamped with S which matches the global synchronization count, so the serialization count stamp protocol module 312 will detect that an active stamp is already placed on this object and will not proceed, whereas other objects, object 2 and object 3, can continue to be active and accessed during the same window and they will just have their stamps set to S. Then eventually the serialization count stamp protocol module 312 will reach a synchronization point which will bump the global thing count to S+1. The serialization count stamp protocol module 312 will see that objects 1-3 are obviously stamped with S and the global count is S+1 and will determine that there's no active stamp. So they can take the lock and take and stamp the object 1 with the S+1 global count.

Regarding the thread timestamp protocol module 314, global serialization is not utilized. Rather, each thread is assigned a monotonically increasing timestamp when it begins running within the storage operating system 200. At this time, the thread timestamp is inserted in a data structure called a min-heap to track all the in-flight read timestamps. The min-heap data structure can include a tree based data structure where the smallest element in the tree is located at the top. In this case, the minimum active thread timestamp will be placed in this min-heap. The element at the root of the min-heap data structure will always be the lowest thread timestamp that is still running. So when the thread preempts, i.e. removes itself from the CPU, it will remove its timestamp from the min-heap data structure. The min-heap data structure may be located within the disk storage (RAID) layer 224. To prevent a separate thread from finding object 500 and evicting it, a thread stamps the object 500 with its timestamp. To determine whether object 500 is stamped, a thread compares the current stamp (if any) with the minimum in-flight thread timestamp (retrieved from the min-heap data structure). If the stamp is lower, then it can be sure that the thread holding the lock is no longer in flight and therefore object 400 is not already stamped. In other words, the minimum in-flight thread timestamp is the oldest active thread and the thread timestamp protocol module 314 will compare that thread to the current stamp on stamped object 400. If the stamp is lower than any in-flight timestamp then the thread timestamp protocol module 314 can determine that the thread previously responsible for stamping object 400 is no longer running. If the stamp is equal or higher, then it cannot be known whether the thread is still in-flight and so it is determined the object is stamped. A lock attempt only proceeds to stamp the object if no active stamp is present.

In some embodiments, where multiple readers access block 500 to exclude write operations, the thread timestamp protocol module 314 tracks whether the locking was done by a reader or a writer. When accessing the object for reading, the thread timestamp protocol module 314 determines if there is an active writer using the approach above. If so, the thread timestamp protocol does not acquire the lock. Where there is no active writer, and the current object read stamp is lower than the thread's timestamp or if the object has no stamp, then the timestamp is placed on the object. Whereas, if the current stamp is higher than the thread's timestamp, then no action needs to be performed as the stamp will already be retained for as long the current thread is running. When accessing the object for writing, the thread timestamp protocol module 314 stamps object 400—where there is no active stamp of any kind (reader or writer).

Stamped object 400 will remain locked until all threads as old as the locking thread have become inactive. As a result, the locking thread is no longer active. Thus, locks are implicitly released once all thread timestamp less than or equal to a given thread's are removed from the RAID layer 224. In addition, the locks may be held across preemption. For example, rather than acquiring a new timestamp when a thread starts, new timestamps are assigned only once it is known that the thread holds no locks. Similarly, the thread timestamp is only removed from the RAID layer 224 at this time.

Figure 5:
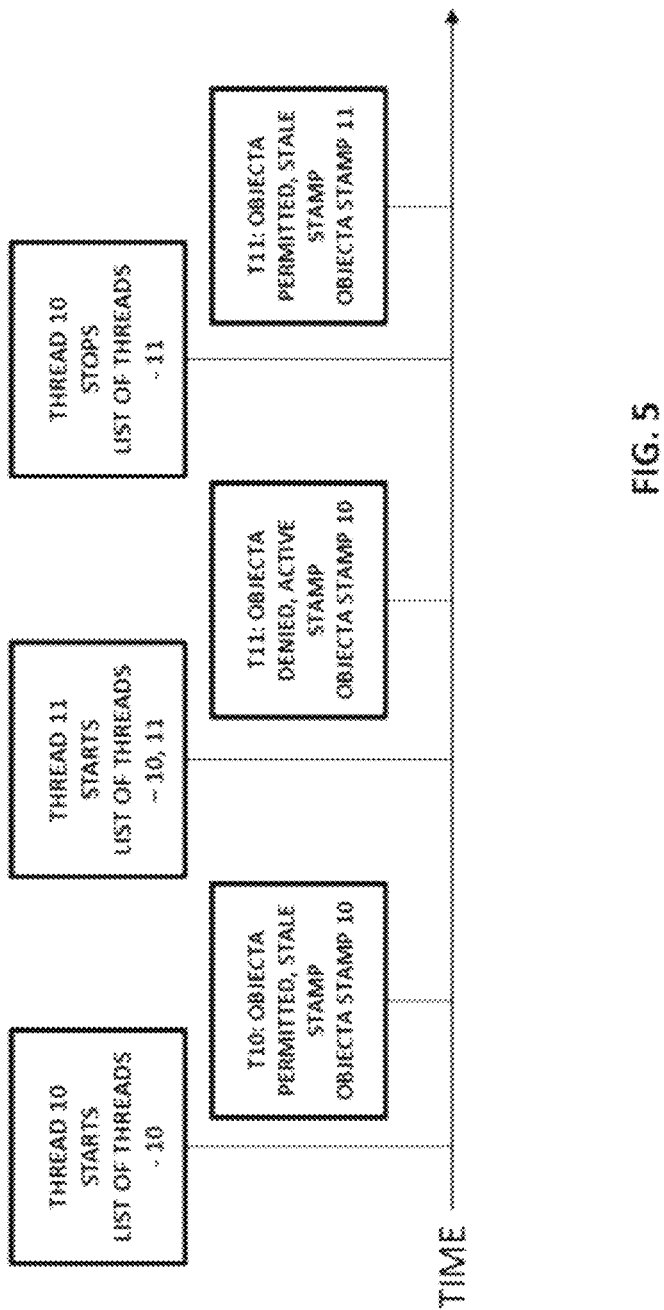
FIG. 5 is a schematic block diagram of thread time stamping that may be advantageously used with the present disclosure.

Referring to FIG. 5, a schematic block diagram of thread time stamping that may be advantageously used with the present disclosure. FIG. 5 exemplifies a timeline based on particular objects and tracking the state. Thread number 10 is the first thread introduced into the system, so the global list of threads that are running includes only thread 10. At which time, thread 10 will access object A. Because object A has not recently been accessed, it's permitted. Object A is then stamped with stamp 10. Thread 11 is now introduced into the system, increasing the global list of running threads to 10 and 11. The lowest number thread is 10, so that would be at the min-heap data structure. If thread 11 attempts to access object A, where object A has an active stamp 10. Because stamp 10 is still in the min-heap data structure that access would be denied. Where thread 10 stops running, the global list of threads is just thread number 11. Upon request to access object A there, the system recognizes there's a stale stamp because stamp 10 is less than the existing thread timestamps in the min-heap data structure. This access is permitted and object A acquires the stamp of the current thread 11.

An exemplary method for efficiently administering access for shared resources, such as data buffers, stored on a storage system will now be described with reference to FIGS. 1-5. Referring more specifically to FIG. 6, an exemplary method for stamping a plurality of computer data objects utilizing the serialization count stamp protocol is illustrated. In step 602 in this particular example, a first global serialization occurs to process the threads within the operating system 200. The global serialization occurs at periodic intervals in the storage operating system 200 to process each thread. A global serialization count can be tracked that is implemented at each serialization point. In step 604, a stamp is placed on object 500 by any thread that accesses a buffer in memory to prevent a separate thread from finding this buffer resident in memory and evicting it underneath the previous thread (thereby changing what is in the buffer). The object 500 is stamped to become stamped object 400. The stamp is the current value of the serialization count. Subsequent access attempts on stamped object 400 will find the current stamp matches the serialization count, determining the object 400 is already stamped and associated with a specific thread. In step 606, the serialization count will be incremented at the next global synchronization point. This renders the outstanding stamps prior to the increment stale, effectively releasing the objects, so subsequent access attempts will be ensured not to find an active stamp. In this way, all active locks are implicitly released when the serialization count is incremented.

Figure 7:
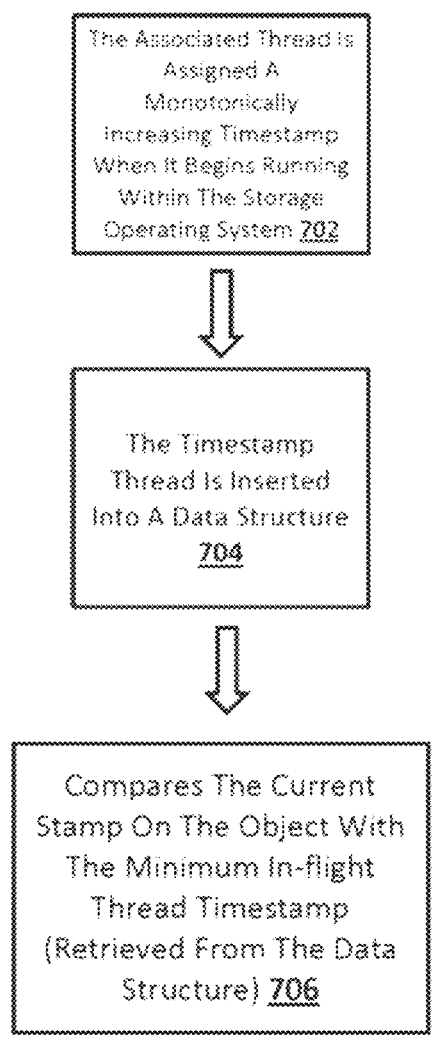
FIG. 7 is an exemplary method for locking a plurality of computer data objects utilizing the thread timestamp protocol.

Another exemplary method for efficiently administering locks for shared resources, such as data buffers, stored on a storage system will now be described with reference to FIGS. 1-5. Referring more specifically to FIG. 7, an exemplary method for locking a plurality of computer data objects utilizing the thread timestamp protocol is illustrated. Each computer data object is associated with a thread. In step 702 in this particular example, the associated thread is assigned a monotonically increasing timestamp when it begins running within the storage operating system 200. The timestamp signifies that each computer data object associated with the thread is stamped, or locked. In step 704, the timestamp of the thread is inserted into a data structure. The data structure is utilized to track all active timestamp of the threads. The data structure is organized hierarchically based on timestamp of the thread activity. For example, the minimum active thread timestamp will be placed in this data structure. The element at the root of the data structure will always be the lowest active thread timestamp. In step 706, a thread compares the current stamp on the object with the minimum in-flight thread timestamp (retrieved from the data structure). If the stamp is lower, then the object is not already stamped. In other words, the minimum in-flight thread timestamp is the oldest active thread and the thread timestamp protocol module 314 will compare that thread to the current stamp on stamped object 400. If the stamp on object 400 is lower than any in-flight timestamp then the thread timestamp protocol module 314 can determine that the thread that was previously responsible for accessing stamped object 400 is no longer running. If the stamp is equal or higher, then it cannot be known whether the thread is still in-flight and so it is assumed the object is stamped.

The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and sub combinations of the preceding elements and aspects.

What is claimed is:

1. A method, comprising:
   initializing a periodic, processor executable serialization process with a first count value indicating a first instance of the serialization process at a first time for controlling access by a plurality of processor executable threads to a plurality of objects stored in a memory;
   stamping, by the first thread, an object of the plurality of objects with the first count value and an indicator indicating an access type to access the object, in response to the first thread determining that the object is available for access, the stamped object indicating that the object is locked by the first thread, and based on the access type and the first count value, the stamped object is inaccessible to a second thread for a certain type of access;
   wherein the first count value is used to grant access to any of the plurality of objects that are available for access to any of the plurality of threads during the first instance of the serialization process;
   incrementing the first count value to a second count value at a second time, indicative of a second instance of the serialization process automatically unlocking the stamped object by rendering the first count value stale at the second instance and providing the second thread access to the unlocked object,
   wherein any existing stamps for the plurality of objects stamped by the plurality of threads are rendered stale, in response to the first count value being incremented to the second count value, and any active locks corresponding to the plurality of objects are implicitly released at the second time;
   wherein the second thread stamps the unlocked object with the second count value indicating that the unlocked object is locked, and based on an access type, is unavailable for the type of access indicated by the access type by another thread;
   wherein the second count value is used to grant access to any of the plurality of objects that are available for access to any of the plurality of threads during the second instance of the serialization process.

2. The method of claim 1, further comprising: determining, by the first thread, that no other thread has locked the object for a write type access, prior to stamping the object with the first count value for a read type access by the first thread.

3. The method of claim 1, wherein the second time for incrementing the first count value is based on a serialization count stamp protocol configured for a storage operating system.

4. The method of claim 1, further comprising: denying access to the object by the first thread, in response to determining that another thread has stamped the object with the first count value for a write type access.

5. The method of claim 1, wherein the object is stamped by the first thread upon accessing a buffer in a memory.

6. The method of claim 1, further comprising: determining, by the first thread, that no other thread has locked the object for any type of access, prior to stamping the object for a write type access by the first thread.

7. The method of claim 1, further comprising: enabling read type access to the object by the first thread, without stamping the object with the first count value, in response to determining that the object is already stamped with the first count value by another thread for a read type access.

8. A non-transitory, machine readable storage medium having stored thereon instructions for performing a method, comprising machine executable code which when executed by at least one machine, causes the machine to:
   initialize a periodic, processor executable serialization process with a first count value indicatinq a first instance of the serialization process at a first time for controllinq access by a plurality of processor executable threads to a plurality of objects stored in a memory;
   stamp, by the first thread, an object from the plurality of objects with the first count value and an indicator indicating an access type to access the object, in response to the first thread determining that the object is available for access, the stamped object indicating that the object is locked by the first thread, and based on the access type and the first count value, the stamped object is inaccessible to a second thread for a certain type of access;
   wherein the first count value is used to grant access to any of the plurality of objects that are available for access to any of the plurality of threads durinq the first instance of the serialization process;
   increment the first count value to a second count value at a second time, indicative of a second instance of the serialization process;
   automatically unlock the stamped object by rendering the first count value stale at the second instance; and
   provide the second thread access to the unlocked object, wherein any existing stamps for the plurality of objects stamped by the plurality of threads are rendered stale, in response to the first count value being incremented to the second count value, and any active locks corresponding to the plurality of objects are implicitly released at the second time;
   wherein the second thread stamps the unlocked object with the second count value indicating that the unlocked object is locked, and based on an access type, is unavailable for the type of access indicated by the access type by another thread;
   wherein the second count value is used to grant access to any of the plurality of objects that are available for access to any of the plurality of threads during the second instance of the serialization process.

9. The non-transitory machine readable storage medium of claim 8, further comprising machine executable code that causes the machine to: determine, by the first thread, that no other thread has locked the object for a write type access, prior to stamping the object with the first count value for a read type access by the first thread.

10. The non-transitory machine readable storage medium of claim 8, wherein the second time for incrementing the first count value is based on a serialization count stamp protocol configured for a storage operating system.

11. The non-transitory machine readable storage medium of claim 8, further comprising machine executable code that causes the machine to: deny access to the object by the first thread, in response to determining that another thread has stamped the object with the first count value for a write type access.

12. The non-transitory machine readable storage medium of claim 8, wherein the object is stamped by the first thread upon accessing a buffer in a memory.

13. The non-transitory machine readable storage medium of claim 8, further comprising machine executable code that causes the machine to: determine, by the first thread, that no other thread has locked the object for any type of access, prior to stamping the object for a write type access by the first thread.

14. The non-transitory machine readable storage medium of claim 8, further comprising machine executable code that causes the machine to: enable read type access to the object by the first thread, without stamping the object with the first count value, in response to determining that the object is already stamped with the first count value by another thread for a read type access.

15. A device, comprising:
   a memory containing machine readable medium comprising machine executable code having stored thereon instructions; and
   a processor coupled to the memory configured to execute the machine executable code to:
   initialize a periodic, processor executable serialization process with a first count value indicating a first instance of the serialization process at a first time for controlling access by a plurality of processor executable threads to a plurality of objects stored in a memory;
   stamp, by the first thread, an object from the plurality of objects with the first count value and an indicator indicating an access type to access the object, in response to the first thread determining that the object is available for access, the stamped object indicating that the object is locked by the first thread, and based on the access type and the first count value, the stamped object is inaccessible to a second thread for a certain type of access; wherein the first count value is used to grant access to any of the plurality of objects that are available for access to any of the plurality of threads during the first instance of the serialization process;
   increment the first count value to a second count value at a second time, indicative of a second instance of the serialization process;
   automatically unlock the stamped object by rendering the first count value stale at the second instance; and
   provide the second thread access to the unlocked object, wherein any existing stamps for the plurality of objects stamped by the plurality of threads are rendered stale, in response to the first count value being incremented to the second count value, and any active locks corresponding to the plurality of objects are implicitly released at the second time;

wherein the second thread stamps the unlocked object with the second count value indicating that the unlocked object is locked, and based on an access type, is unavailable for the type of access indicated by the access type by another thread;

wherein the second count value is used to grant access to any of the plurality of objects that are available for access to any of the plurality of threads during the second instance of the serialization process.

16. The system of claim 15, wherein the machine executable code further causing the processor to: determine, by the first thread, that no other thread has locked the object for a write type access, prior to stamping the object with the first count value for a read type access by the first thread.

17. The system of claim 15, wherein the second time for incrementing the first count value is based on a serialization count stamp protocol configured for a storage operating system.

18. The system of claim 15, wherein the machine executable code further causing the processor to: deny access to the object by the first thread, in response to determining that another thread has stamped the object with the first count value for a write type access.

19. The system of claim 15, wherein the object is stamped by the first thread upon accessing a buffer in a memory.

20. The system of claim 15, wherein the machine executable code further causing the processor to: determine, by the first thread, that no other thread has locked the object for any type of access, prior to stamping the object for a write type access by the first thread.

* * * * *